United States Patent [19]
Sacks

[11] Patent Number: 6,069,102
[45] Date of Patent: May 30, 2000

[54] CREEP-RESISTANT, HIGH-STRENGTH SILICON CARBIDE FIBERS

[75] Inventor: Michael D. Sacks, Gainesville, Fla.

[73] Assignee: University of Florida, Gainesville, Fla.

[21] Appl. No.: 09/082,868

[22] Filed: May 21, 1998

Related U.S. Application Data

[60] Provisional application No. 60/055,422, Aug. 4, 1997.

[51] Int. Cl.[7] .................................................. C04B 35/565
[52] U.S. Cl. ........................... 501/95.1; 501/88; 264/625; 264/627; 264/682
[58] Field of Search .................... 501/88, 95.1; 264/625, 264/627, 682

[56] References Cited

U.S. PATENT DOCUMENTS

| | | | |
|---|---|---|---|
| 5,139,871 | 8/1992 | Wallace et al. | 501/95.1 |
| 5,792,416 | 8/1998 | Sacks et al. | 264/625 |
| 5,851,942 | 12/1998 | Sacks et al. | 501/95.1 |
| 5,928,978 | 7/1999 | Barnard et al. | 501/95.1 |

*Primary Examiner*—Karl Group
*Attorney, Agent, or Firm*—Thomas C. Saitta

[57] ABSTRACT

A high strength, high creep resistant, boron-doped, silicon carbon fiber having no boron nitride coating, originally formed by sintering, is produced by exposing the fiber to a nitrogen atmosphere at a temperature equal to or preferably elevated above the sintering temperature and also exposing the fiber to a carbon monoxide-containing atmosphere at a temperature sufficient to remove boron and boron nitride. The nitrogen atmosphere step may be performed before or after the carbon monoxide-containing atmosphere step. The resulting, uncoated SiC fibers have tensile strengths greater than approximately 2.0 GPa and Morscher-DiCarlo BSR test creep resistance M values greater than approximately 0.75 at 1400 degrees C. for one hour in argon. The method is applicable to non-sintered fibers as well, in which case the nitrogen exposure is carried out at between approximately 1750 to 2250 degrees C. and the carbon monoxide exposure is carried out at between approximately 1600 to 2200 degrees C.

15 Claims, 7 Drawing Sheets

CREEP-RESISTANT, HIGH-STRENGTH SILICON CARBIDE FIBERS

This application claims the benefit of U.S. Provisional Application No. 60/055,422, filed Aug. 4, 1997.

This invention was made with government support under grant/contract number F49620-94-1-0429 awarded by the Air Force Office of Scientific Research. The government has certain rights in the invention.

BACKGROUND OF THE INVENTION

Silicon carbide (SiC) is a material with excellent mechanical properties at high temperatures. SiC fibers are of great interest for the fabrication of composite materials, especially composite materials for use in high temperature structural applications. This invention concerns a method for producing silicon carbide (SiC)-based fibers with improved creep resistance and high tensile strength, and the fibers so produced, by exposing the sintered fibers to nitrogen gas at temperatures above the sintering temperature and exposing the fibers to carbon monoxide gas at lower temperature, with the exposure steps occurring in either order.

There are many methods of forming SiC ceramics. SiC ceramics are often prepared by forming and consolidating fine SiC particles into a desired shape and subsequently heat treating (i.e., sintering) the "green" shape in order to eliminate the interparticle pores (i.e., void space) and to obtain a high-strength body with high relative density (i.e., with little or no residual porosity).

SiC ceramics are also prepared by other methods, especially by chemical vapor deposition (CVD) and by heat treatment of organosilicon polymers. For example, organosilicon polymers have been used to prepare fine SiC particles, fibers, bulk samples, coatings, etc. Continuous SiC fibers with fine diameters (e.g., ~5–25 $\mu$m) are generally prepared from organosilicon polymers. Some SiC fibers (and other types of samples) prepared using organosilicon polymers develop fine SiC crystallites and fine pores at some stage during processing and, hence, a sintering step is required to ultimately produce a dense (low porosity), high-strength SiC sample.

The typical sintering temperatures for preparing dense SiC are in the range of approximately 1700–2300° C. The required temperature is highly dependent upon the size of the SiC particles (or crystallites) which comprise the porous body that is being sintered. For example, SiC bodies fabricated from the more conventional powder processing routes generally require higher sintering temperatures (~1900–2300° C.) and this results in sintered bodies comprised of coarser grain sizes (>1 $\mu$m). In contrast, organosilicon polymer-derived SiC bodies (e.g., fibers) can be sintered at lower temperatures (e.g., ~1700–1900° C.) and, consequently, the resulting grain sizes are usually smaller (<1 $\mu$m).

For high temperature applications, it would be desirable to have SiC fibers with high strength and high resistance to creep. As discussed by DiCarlo (in Composites Science and Technology, 51 213–222, 1994), it is difficult to achieve both of these properties simultaneously in SiC fibers. The strength of SiC fibers is controlled by "flaws" (e.g., voids, particulate impurities, kinks, grains, etc.). When other flaws are avoided through careful processing, the strength is controlled by the size of the SiC grains comprising the fibers. Hence, it is generally observed that carefully processed organosilicon polymer-derived SiC fibers have much better strength compared to powder-derived SiC fibers because the grain sizes are much smaller. The tensile strengths for organosilicon polymer-derived SiC fibers are typically in the range of ~2.0–3.5 GPa. (Fiber tensile strengths $\geq$2 GPa are desirable for the development of high-strength, fiber-reinforced composites.) In contrast, the tensile strengths for powder-derived SiC fibers are usually much lower, e.g., ~0.5–1.5 GPa.

The creep resistance of SiC fibers is usually highly dependent upon grain size also. However, the effect of grain size on creep behavior is the opposite of its effect on strength. The creep resistance increases as the grain sizes increases. Hence, powder-derived SiC fibers usually show better creep resistance than polymer-derived SiC fibers. Thus, it has not been possible in the past to make SiC fibers with both high tensile strength and high creep resistance. The difficulty in simultaneously achieving high tensile strength and high creep resistance in SiC fibers was demonstrated by Takeda et al. (in Ceram. Eng. Sci. Proc., 17[4] 35–42, 1996) using the organosilicon polymer-derived fibers known as HI-NICALON TYPE S™ which are produced by Nippon Carbon Co. As-prepared HI-NICALON TYPE S™ fibers have an overall composition close to that of stoichiometric SiC, low-oxygen-content ($\leq$0.2 wt %), high tensile strength (~3 GPa), and fine diameter (~12 $\mu$m). Takeda et al. heat treated these fibers at temperatures up to 1900° C. for 10 hours in an argon atmosphere. The fiber tensile strengths decreased with increasing heat treatment temperature, reaching values below 1 GPa for the longest heat treatment carried out at the highest temperature. X-ray diffraction line broadening measurements showed that the SiC crystallite (grain) sizes increased as the re-heat treatment temperature (and/or time) increased. Hence, the decrease in tensile strength with heat treatment was attributed to the increase in grain sizes. The creep behavior of the SiC fibers was assessed using a bend stress relaxation (BSR) test. In contrast to the strength behavior, the creep resistance of the fibers increased as the grain size increased. Fibers given the longest heat treatment carried out at the highest temperature showed the best creep resistance, as assessed by the BSR test. Heat treatments of the organosilicon polymer-derived HI-NICALON TYPE S™ fibers at the highest temperature and longest time resulted in fibers that were similar to powder-derived fibers in terms of good creep resistance and low strength values. This combination was observed because the heat treatments resulted in fibers with relatively large grain sizes.

It is well known that SiC ceramics with high relative density (i.e., low residual porosity) and fine grain sizes are desirable in order to attain high strength. However, it is very difficult to prepare pure SiC with high relative density and fine grain sizes by sintering methods, especially by pressureless sintering methods. In samples comprised of fine particles (or fine crystallites), pure SiC generally undergoes coarsening (growth) of particles (crystallites) and pores during high temperature heat treatment because of the dominance of surface diffusion and/or vapor phase diffusion processes. Thus, very little densification (i.e., pore removal) occurs in pure SiC during high temperature heat treatment. As a result of this problem, additives (i.e., "sintering aids") are used to enhance the densification (and prevent coarsening) during sintering and, thereby, allow the fabrication of SiC with high relative density and fine grain sizes. Several additives have been found effective as sintering aids for SiC, but boron-containing compounds are the most commonly used additives. Varying amounts of boron compounds have been reported as effective for sintering (e.g., 0.2–5 wt %), but boron concentrations on the order of ~0.5–1 wt % are most common. When sintering aids are used, the typical sintering temperatures for preparing dense SiC are in the range of approximately 1700–2300° C. As noted earlier, the required temperature is highly dependent upon the size of the SiC particles (or crystallites) which comprise the porous body that is being sintered.

In addition to controlling the sintering temperature and using the proper amount and type of sintering additive, it is also important to control the gas atmosphere during sintering of SiC in order to achieve high relative density and fine grain size. There have been numerous studies in which SiC was sintered in various atmospheres. It is well known that oxidizing atmospheres are undesirable, while atmospheres which are usually referred to as "inert" or "chemically inert" are considered desirable. Argon is the most common atmosphere used in sintering of SiC. Helium, nitrogen, and vacuum have also been widely reported as useful atmospheres for sintering of SiC.

As described in more detail below, there have been many prior studies in which SiC was fabricated using nitrogen as the atmosphere during the sintering (densification) process. In the prior art, however, heat treatments in nitrogen-containing atmospheres have only been carried out at the sintering temperatures or at temperatures below the sintering temperatures. Furthermore, the prior art specifically teaches against heat treating SiC at temperatures above that required for the purposes of sintering. According to the prior art, this will result in a loss of strength of the SiC body. In contrast, the current invention teaches the surprisingly result that high strengths can be maintained in samples which are heat treated in a nitrogen-containing atmosphere at temperatures higher than the sintering temperature.

Prochazka in U.S. Pat. Nos. 3,853,566, 3,960,577, 3,954,483, 3,968,194, and 4,004,934 reported that small amounts of boron (especially when combined with small amounts of carbon) could be used to enhance densification and produce SiC bulk samples with high densities and fine grain sizes. Boron was incorporated by mixing SiC powders with boron-containing powders such as elemental boron, boron carbide, and boron nitride. It was also reported that gaseous boron trichloride could be used to vapor-phase dope boron directly into SiC powders during their synthesis by CVD methods. The minimum amount of boron needed for good densification was approximately 0.3 wt %, although higher amounts were generally used. Prochazka and many others researchers concluded that it is desirable to use the lowest possible temperature and shortest possible time that are needed to accomplish densification (i.e., elimination of porosity) during sintering of SiC. This is not only because of the cost savings, but also because prolonged heat treatment results in grain growth in the sintered body. Grain growth is considered undesirable in many cases because it usually results in a reduction in the strength of the sintered body. For example, in U.S. Pat. No. 4,004,934, Prochazka states: "An extended dwell [time] at high temperature is harmful because it brings about coarsening of the microstructure and consequently degradation of the mechanical properties. Thus, the shortest hold [at the sintering temperature] is preferable." Because Prochazka used powder processing methods, sintering and hot pressing temperatures were generally in the range of ~1900–2100° C. (with the lower temperatures in this range being used for samples which were hot pressed). From U.S. Pat. Nos. 3,853,566, 3,960,577, 3,954,483, 3,968,194, and 4,004,934, it is reported that boron-doped SiC bodies can be sintered to high relative density using several different gas atmospheres, including argon, helium, and nitrogen. In the first claim of U.S. Pat. No. 4,004,934, it is stated that a dense boron-doped SiC ceramic can be made by "sintering of the green body in an inert atmosphere chemically-inert with respect to silicon carbide at atmospheric pressure or below atmospheric pressure at a temperature of about 1900–2100° C. . . . ." A nitrogen atmosphere was used in most of the examples in U.S. Pat. No. 4,004,934, so this patent teaches that SiC is chemically-inert in nitrogen.

Many other studies have been reported in which SiC is sintered in a nitrogen-containing atmosphere. In each case, the prior art teaches that the nitrogen atmosphere should be used at the lowest temperature required for densification. For example, Urasato et al. in U.S. Pat. No. 5,011,639 sintered green bodies prepared with SiC powders which had been mixed with ~0.2–5.0 wt % of boron powder or a boron compound powder (e.g., boron carbide, boron oxide, titanium diboride). In this case, nitrogen was not considered an inert gas. The patent states that green bodies were ". . . sintered in an atmosphere of an inert gas containing nitrogen in a minor concentration. The inert gas here implied is a rare gas such as helium, argon, and the like. The concentration of nitrogen in the atmosphere of mainly the inert gas should be in the range from 0.005 to 5% by volume or, preferably, from 0.01 to 2% by volume." It is stated that "The furnace for sintering should be filled with nitrogen-containing inert gas throughout the sintering procedure." In addition, it is stated that "The temperature of sintering should be in the range of 1800 to 2200° C. or, preferably, from 1950 to 2150° C. When the temperature for sintering is too low, the green body cannot be fully sintered so that the sintered body would have somewhat decreased density. When the temperature of sintering is too high, on the other hand, undue grain growth and thermal decomposition of silicon carbide may take place so that the sintered body has a decreased electric resistivity and mechanical strength."

Boron-doped SiC bodies with high relative density have also been formed using mixtures of SiC particles and borosiloxane polymers. This was demonstrated by Burns et al. in U.S. Pat. No. 5,112,779 using sintering temperatures in the range of 2000–2200° C. to achieve densification. Nitrogen was considered an inert atmosphere suitable for sintering. It was stated that "Inert atmospheres are used for sintering. . . . For the purposes of this invention, an inert atmosphere is meant to include an inert gas, vacuum, or both. If an inert gas is used it may be, for example, argon, helium, or nitrogen."

Powder processing methods can be used to form SiC fibers, especially fibers with larger diameter (i.e., >25 μm). Frechette et al. in U.S. Pat. No. 4,908,340 and in Ceram. Eng. Sci. Proc. 12[7–8] 992–1006, 1991 (by F. Frechette, B. Dover, V. Venkateswaran, and J. Kim) prepared SiC fibers by either melt spinning or dry spinning of mixtures of SiC particles and organic polymers. Boron was incorporated in the fibers by adding 0.2–1.0 wt % boron carbide powders to the spinning mixtures. Some fibers were heat treated in crucibles which had been coated with slurries containing boron carbide in order to form boron-containing gases during the sintering operation. SiC fibers were sintered at temperatures in the range of 1900–2150° C. in an argon atmosphere or at 2300° C. in a nitrogen atmosphere in order to obtain substantially dense (i.e., low porosity) fibers. (It was reported in U.S. Pat. Nos. 4,004,934 and 4,908,340 and elsewhere that higher sintering temperatures were required for densification (i.e., pore removal) when nitrogen was used as the sintering atmosphere.)

The fibers produced by the method of Frechette at al. are usually referred to as Carborundum SiC fibers in various published scientific papers. As expected from the earlier discussion, these powder-derived fibers had relatively low tensile strength (~1 GPa) because the grain size were relatively coarse (i.e., average grain sizes were greater than 1 $\mu$m and individual grains up to ~10 $\mu$m were observed). However, the fibers showed excellent strength retention after heat treatment at elevated temperature. In addition, creep resistance was excellent, as indicated from both BSR tests and from in-situ creep tests carried out at high temperatures.

Bolt et al. in U.S. Pat. No. 4,942,011 prepared SiC fibers by spinning mixtures of SiC particles and organosilicon polymer. One of the sintering aids used was boron carbide. The concentration of the sintering aids was 0.2–5% based on the SiC weight. Fibers were heat treated (sintered) at temperatures in the range of 1900–2000° C. in an argon atmosphere, although it was indicated that inert or reducing atmospheres could be used.

Birchall and Clegg in U.S. Pat. No. 5,063,107 prepared SiC fibers in a similar manner to Frechette et al. and Bolt et al. They used mixtures of SiC particles and organic polymers. They also utilized known sintering aids, such as boron. Sintering was carried out at 2040° C. for 20 min in an argon atmosphere. It was stated in the patent that "The later stage of the process of the invention will generally be effected in an inert atmosphere by which we mean in an atmosphere which is unreactive with the silicon carbide at the temperature of heating." It is also stated that "It may also be necessary to avoid the use of nitrogen as nitrogen may react with the silicon carbide to produce silicon nitride."

Organosilicon polymers are generally used to produce SiC fibers with fine diameter (i.e., <25 $\mu$m). Yajima et al. in U.S. Pat. Nos. 4,052,430, 4,100,233, 4,220,600, and 4,283,376 developed processes for preparing polycarbosilane polymers and SiC-based fibers from polycarbosilane polymers. The processes developed by Yajima et al. are the basis for NICALON™ fibers which are manufactured by Nippon Carbon Co., Ltd. A similar commercial process involves using a titanium metal-modified polycarbosilane (i.e., a polytitanocarbosilane) polymer and is the basis for TYRANNO™ fibers which are manufactured by Ube Industries Ltd. Yajima et al., in some of the earlier cited patents and in U.S. Pat. No. 4,152,509, also reported that SiC fibers could be prepared from polycarbosilane polymers which were synthesized from a polysilane and a phenyl-containing polyborosiloxane. The organosilicon polymer fibers produced by the various methods of Yajima et al. are pyrolytically decomposed to SiC-based fibers by heat treatment at temperatures usually $\leq$1300° C. Pyrolysis was usually carried out in nitrogen or argon atmospheres or under vacuum. The fibers produced by these methods do not have good thermomechanical stability. The fibers degrade extensively and become extremely weak when heat treated at temperatures above approximately 1200–1400° C. This is because of carbothermal reduction reactions that occur as a result of large amounts of oxygen and excess carbon in the SiC fibers.

Wallace et al. in U.S. Pat. No. 5,139,871 reported that the thermomechanical stability of organosilicon polymer-derived SiC fibers, such as TYRANNO™ fibers, can be improved by certain heat treatments in a nitrogen atmosphere. It was specified that heat treatments could be carried out between 800–1800° C., with a preferred range of 1100–1600° C. It was shown that heat treatments in a nitrogen atmosphere alone did not result in any improvement in the thermomechanical properties of the fibers. However, a small improvement in the thermomechanical properties of the fibers was observed when the fibers were placed in intimate contact with carbon particles during the heat treatment in nitrogen. Nevertheless, the fibers still had low strengths (i.e., <1.5 GPa) after heat treatment at only 1600° C.

Takamizawa et al. in U.S. Pat. No. 4,604,367 prepared boron-doped SiC-based fibers using organoborosilicon polymers which were prepared by reacting an organopolysilane with an organoborazine compound. The organoborosilicon polymers were melt spun into green fibers which were infusibilized by oxidative or irradiative cross-linking methods and subsequently pyrolyzed to form SiC-based fiber containing boron and nitrogen. Takamizawa et al. indicated that heat treatments could be carried out in vacuum or inert gas atmospheres at temperatures up to 1800° C., although the preferred heat treatment temperatures were <1600° C. Nitrogen was considered a suitable gas for the pyrolysis process. The resulting fibers showed better strength retention upon high temperature heat treatments compared to NICALON™ fibers, but the fibers still started to show decreased strengths after heat treatments at temperatures above approximately 1100–1200° C. and the strengths were too low for the fibers to be useful at temperatures above approximately 1500° C.–1600° C.

Researchers at Dow Corning have reported in U.S. Pat. Nos. 5,071,600, 5,162,269, 5,167,881, 5,268,336, 5,279,780 and 5,366,943 the fabrication of boron-doped, low-oxygen-content SiC fibers with carbon-rich or near-stoichiometric composition which were prepared from several different organosilicon polymers (i.e., polycarbosilane, methylpolydisilylazane, polyorganosiloxane). In U.S. Pat. Nos. 5,071,600 and 5,162,269, for example, fibers were formed by melt spinning of low-molecular-weight polycarbosilane. Fibers were oxidatively cured to prevent melting of the fibers during subsequent heat treatment. The primary modification of the process of Yajima et al. was to incorporate sufficient amounts of boron (>0.2 wt %) in the fibers so that high relative density and fine grain sizes could be obtained after sintering. The patents describe mostly gas-phase doping methods, in which it was indicated that boron-containing compounds (e.g., diborane, boron trifluoride, boron tribromide, boron trichloride, tetraborane, pentaborane, borazine, trichloroborazine) could be infiltrated into the fibers at temperatures in which the compounds were in the form of gases. The boron-containing gas could be introduced at various stages in the fiber fabrication process, but it must be present prior to the onset of sintering in order to prevent grain coarsening and to allow densification of the porous SiC fibers to occur. In addition to gas phase doping, the Dow Corning patents also describe instances in which the organosilicon polymer can be synthesized such that it contains some boron.

The Dow Corning patents indicate that oxygen, nitrogen, and excess carbon are eliminated from fibers (as gaseous volatiles) during a high temperature pyrolysis stage which occurs in the range of ~1200–1600° C. The fibers develop fine pores during this stage. The porosity is removed by sintering at a temperature typically in the range of 1800–1850° C. (As noted above, boron must be present to prevent grain coarsening and allow pore removal to occur.) The Dow Corning patents teach against the use of nitrogen atmospheres for the high temperature processing steps. In U.S. Pat. No. 5,167,881, it is stated that "At pyrolysis temperatures above about 1400° C., nitrogen-containing atmospheres are not preferred as nitrogen is not inert to the fibers under those temperature conditions. At high temperatures, truly inert gaseous atmospheres are preferred such as argon and/or helium." A similar statement is made in U.S. Pat. No. 5,268,336. (It should be noted that the patents use the term "pyrolysis" to encompass not only the process in which volatiles are removed at lower temperatures, but also the higher temperature sintering process.) The fibers produced in the Dow Corning patents do not contain any nitrogen. The first claim in U.S. Pat. No. 5,162,269 states that the fibers are "nitrogen-free." In U.S. Pat. No. 5,268,336, it is stated "The duration of the pyrolysis treatment should be sufficient to eliminate substantially all oxygen and/or nitrogen from the fibers."

Fiber characterization data, such as reported by Dicarlo (in Composites Science and Technology 51 213–222, 1994), Takeda et al. (Ceram. Eng. Sci. Proc., 17[4] 35–42, 1996), and Lipowitz et al. (Ceram. Eng. Sci. Proc., 16[4] 55–62, 1995), indicated that SiC fibers produced according to the methods described in the Dow Corning patents have thermomechanical stability which is much better than NICALON™ and TYRANNO™ fibers and similar to HI-NICALON TYPE S™ fibers. The fibers retained 96% of their original tensile strength after heat treatment at 1550° C. for 10 hours in an argon atmosphere. The fibers retained 74% of their original tensile strength after heat treatment at 1800° C. for 12 hours in an argon atmosphere. The fibers produced according to the Dow Corning patents are known as SYLRAMIC™ fibers.

Sacks et al. in U.S. Pat. No. 5,792,416 reported the fabrication of boron-doped, low-oxygen-content SiC fibers with near-stoichiometric composition, high relative density, and high tensile strength which were prepared using high-molecular-weight polycarbosilane polymers. Fibers were sintered in an argon atmosphere. In most examples, the fibers were sintered in the range of 1750–1800° C. for 1 hour. If fibers were sintered at higher temperatures, shorter sintering times were used to produced fibers with high relative density and high strength. For example, sintering times were 12 and 2 minutes when sintering temperatures were 1845 and 1890° C., respectively. Sintered SiC fibers produced by this method had an average tensile strength of ~2.85 GPa. The fibers typically retained more than 90% of the original tensile strength after being re-heated in an argon atmosphere at 1800° C. for 4 hours. However, the tensile strength decreased to ~75% of the original strength after heat treatment in argon at 1950° C. for 1 hour. Hence, heat treatments in an argon atmosphere which were carried out at higher temperatures or longer times than needed for sintering resulted in decreased tensile strengths of the fibers.

Sacks, in U.S. Provisional Appl. Ser. No. 60/055,424 entitled "Silicon Carbide Fibers with Boron Nitride Coatings," reported that boron-doped SiC fibers with high relative density (i.e., little or no porosity) can be heat treated in a nitrogen-containing atmosphere, at a temperature which is higher than the temperature used to originally sinter the fibers, to develop a boron nitride (BN) layer at the SiC fiber surface. In contrast to all previous results with SiC, the heat treatment at temperatures above the sintering temperature did not result in a decrease in the strength. The BN-coated SiC fibers prepared in this manner still had high tensile strengths, i.e., the strengths were approximately the same as the original uncoated SiC fibers.

SUMMARY OF THE INVENTION

A high strength, high creep resistant, boron-doped, silicon carbon fiber, having no boron nitride coating, originally formed by sintering, is produced by exposing the fiber to a nitrogen atmosphere at a temperature at least equal to but preferably elevated above the sintering temperature (approximately between 1750 and 2250 degrees C. for sintered or non-sintered fibers) and also exposing the fiber to a carbon monoxide-containing atmosphere at a temperature approximately between 1600 and 2200 degrees C., more preferably between approximately 1700 and 2000 degrees C., and most preferably between 1700 and 1900 degrees C. The nitrogen atmosphere step may be performed before or after the carbon monoxide-containing atmosphere step. The resulting, uncoated SiC fibers have tensile strengths greater than approximately 2.0 GPa and Morscher-DiCarlo bend strength relaxation (BSR) creep resistance M values greater than approximately 0.75.

In one embodiment, the SiC fiber is first exposed to a nitrogen atmosphere at a temperature approximately 50 degrees C. above the sintering temperature for a period of approximately 10 minutes. The temperature is then lowered approximately 190 degrees C. and the nitrogen atmosphere is replaced with an atmosphere of approximately 15% carbon monoxide and 85% argon, this temperature is maintained for about 30 minutes and the fiber then allowed to cool. In a second embodiment, the SiC fiber is first exposed to an atmosphere of approximately 15% carbon monoxide and 85% argon at the sintering temperature for about 50 minutes. The atmosphere is then replaced with a nitrogen atmosphere and the temperature elevated approximately 100 degrees C. above the sintering temperature, maintained for about 30 minutes and the fiber then allowed to cool.

DETAILED DESCRIPTION OF THE INVENTION

Figure 1:
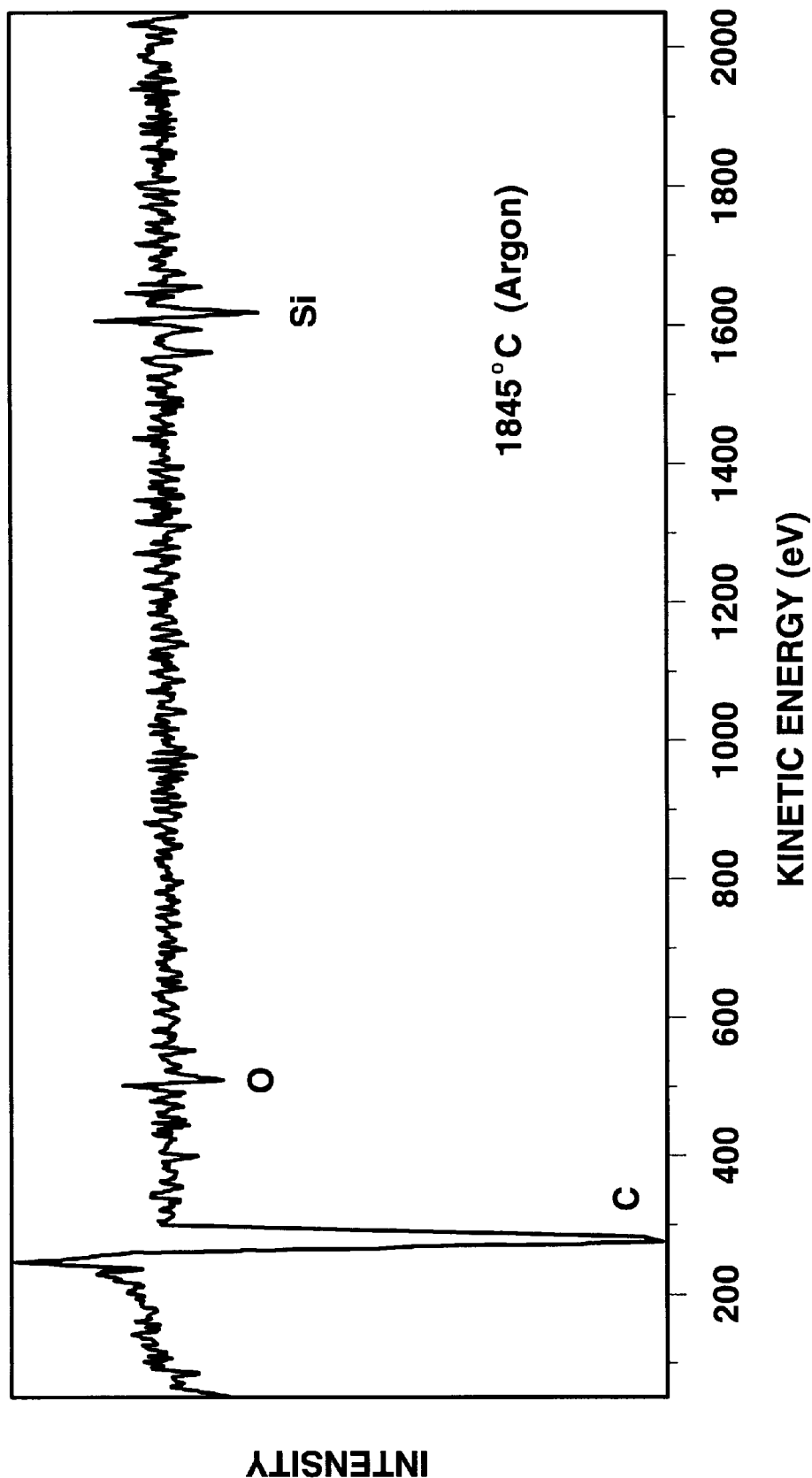
FIG. 1 is an AES spectrum for the control (uncoated) SiC fiber sample of Example 1 after heat treatment at 1845° C. for 12 minutes in argon.

In the current invention, it was discovered that a BN coating is not a requirement for the SiC fibers to have high tensile strength and improved creep resistance. In this invention, it was determined that heat treatment carried out using both nitrogen and carbon monoxide can be used to produce SiC fibers with high tensile strength and high creep resistance, but with no BN coating at the fiber surface.

The initial processing steps for preparing the SiC fibers in this invention were the same as in U.S. Pat. No. 5,792,416 by Sacks et al. This includes the following steps: (i) Polycarbosilane (PCS) polymer is synthesized by pressure pyrolysis of polydimethylsilane (PDMS). The average molecular weight for the PCS is typically in the range of approximately 7,000–16,000. (ii) A concentrated fiber-spinning solution ("spin dope") is prepared using PCS, one or more solvents (e.g., toluene), one of more "spinning aids"

(e.g., polysiloxane (PSO), polysilazane (PSZ)), and a boron-containing sintering aid (e.g., solid boron hydride). The typical range of polymer concentrations are from approximately 60 to 75% and the typical spin dope viscosities are in the range of approximately 10 to 100 Pa·s. (iii) Fibers are formed by extruding the spin dope through a spinneret and collecting the extruded filaments on a winding wheel. (iv) The "green" (as-collected) fibers are heat treated using oxidizing and non-oxidizing atmospheres to accomplish removal of solvent and incorporation of oxygen (less than about 300° C.), pyrolytic decomposition of the organosilicon polymer (less than about 1200° C.), carbothermic reduction reactions which remove excess carbon and oxygen (less than about 1650° C.), and sintering to densify the fiber (less than about 2000° C.). In the last of these initial processing steps, the fibers are heat treated in an inert gas atmosphere, such as in argon gas, in order to produce a fiber with high relative density (i.e., low residual porosity). In the present invention, additional processing steps are used. In particular, the sintered fibers are heat treated in a nitrogen gas-containing atmosphere and a carbon monoxide (CO) gas-containing atmosphere.

The heat treatment in a nitrogen gas-containing atmosphere is carried out at higher temperatures (preferably between about 1750 to 2250 degrees C.) and/or longer times than required for densification. This heat treatment results in larger grain size which is beneficial for creep resistance. It is also possible that some nitrogen may be incorporated in the SiC lattice which may be beneficial for the creep resistance. It should be emphasized that the heat treatment in the nitrogen-containing atmosphere is not carried out during the process of sintering the SiC fibers. As described in detail earlier, it is well-known that nitrogen has been used as the atmosphere for sintering of SiC fibers and other SiC bodies. The present invention differs in that the heat treatment in the nitrogen-containing atmosphere occurs after the sintering (densification) process and at a higher temperature and/or longer time than used for sintering (densification). Some of the prior art indicates that the use of nitrogen atmosphere during the sintering process may be detrimental to the preparation of SiC fibers with high tensile strength. A similar observation is reported in this invention. The prior art also indicates that heat treatments above the temperature needed for sintering (densification) result in decreases in the strengths of SiC fibers. However, in the current invention, heat treatment of fibers in a nitrogen atmosphere at temperatures above the sintering temperature results in fibers with high tensile strength.

It is known from U.S. Provisional Appl. Ser. No. 60/055,424, the disclosure of which is incorporated herein by reference, that heat treatment of boron-doped SiC fibers in a nitrogen gas-containing atmosphere at temperatures above the sintering temperature will result in a BN coating on the surface of the fibers. These fibers have high strength and high creep resistance. In the current invention, SiC fibers with high strength and creep resistance are prepared without the BN coating by also using heat treatment in a carbon monoxide (CO) gas-containing atmosphere, which removes boron and boron nitride coatings from the fibers. The latter heat treatment can be carried out before or after the heat treatment in the nitrogen gas-containing atmosphere. The latter heat treatment is carried out at temperatures above the sintering temperature or for longer timed than used for sintering (densification.) The heat treatment in the CO gas-containing atmosphere may occur at temperatures which are lower, comparable, or higher than the sintering temperature (and/or for times which are shorter, comparable, or longer than the sintering time), but typically between 1600 and 2200 degrees C., more preferably between 1700 and 2000 degrees C., and most preferably between 1700 and 1900 degrees C.

The changes which occurs in the SiC fiber structure during the various heat treatments described in this invention are complex. It is not necessary to have a detailed mechanistic understanding of these changes to practice the invention. Nevertheless, it may be helpful in understanding the scope of the invention to postulate the reasons for the high creep resistance and high strength of the fibers prepared according to the methods of this invention.

It is believed that the creep resistance of the SiC fibers prepared by this invention are improved largely due to grain growth when heat treatment is carried out at higher temperatures and/or longer times than used in the sintering process. Transmission electron microscope observations showed that the grain sizes increased when fibers were heat treated in nitrogen at temperatures above the sintering temperature. (Larger grain size would also be expected for heat treatments carried out at the sintering temperature but for much longer times than required for densification.) According to many scientific publications, the creep rate due to bulk and grain boundary diffusional processes decreases as the grain size increases (i.e., improved creep resistance is observed with increased grain size). SiC ceramics are generally believed to undergo creep by diffusional processes, so it is not surprising that improved creep resistance is observed with increasing grain size. Another possible factor which may contribute to the improved creep resistance of the SiC fibers in this invention is that some nitrogen atoms may dissolve (as a solution) into the lattice structure of the SiC grains during the heat treatment in the nitrogen containing atmosphere. This incorporation of nitrogen atoms within the SiC lattice is expected to cause a decrease in the SiC diffusion rates (and, therefore, a decrease in the creep rate).

The SiC fibers in this invention retain high strength after the heat treatments despite the increased grain size. It is postulated that this occurs due to changes in the surface structure of the SiC fibers. In SiC fibers that are processed according to U.S. Pat. No. 5,792,416 and are only given a standard sintering heat treatment, the strength is believed to be controlled by the size of the SiC grains. Fractography revealed that failure during tensile testing often is initiated at the fiber surface. It is believed that larger grains intersecting the surface act as strength-limiting flaws. When fibers are heat treated at temperatures above the sintering temperature in an inert atmosphere such as argon, the flaw sizes that control the strength increase because the grains increase in size. Hence, the tensile strengths are observed to decrease in such cases. However, it is believed that the heat treatments in the gas atmospheres used in this invention change the nature of the surface so that the strength is no longer controlled by the larger SiC grains that form during heat treatment. The larger SiC grains are not present at the immediate surface of the fiber and, hence, the flaw sizes at the surface remain small. For example, in U.S. Provisional Appl. Ser. No. 60/055,424, when the boron-doped SiC fibers are heat treated above the sintering temperature only in a nitrogen-containing gas atmosphere, the fibers have high strength. This heat treatment results in a BN coating on the fibers. The thickness of the coating is typically less than or equal to several tenths of a micrometer. This thickness is smaller than the size of most of the SiC grains in the heat-treated fibers. In addition, the BN grains in the BN coating have small size. For these reasons, the flaws at the surface remain small and the fiber strength remains high. Similarly, in the present invention, the heat treatments in the nitrogen and CO atmospheres also produce a surface layer in which the flaws remain small. This surface layer in this invention, however, is not BN as in U.S. Provisional Appl. Ser. No. 60/055,424. This invention indicates that any heat treatment which produces a surface structure which can limit the strength-limiting flaws to sizes smaller than the typical grains sizes should produce fibers with high tensile strengths.

Another possible factor which may contribute to the retention of high tensile strength of the fibers after the heat treatments in this invention is that the heat treatments may introduce compressive stresses on the surface, possibly due to the difference in thermal expansion coefficient between the near-surface region of the fiber and the SiC interior of the fiber. There is also a possibility that near-surface compressive stresses may also develop if some nitrogen atoms dissolve in the SiC lattice during the heat treatment in the nitrogen.

This invention may be practiced such that all the heat treatments can be carried out together as part of a combined process for fabricating the fibers, i.e., it is not necessary to remove the fibers from the furnace each time the heat treatment involves a different gas atmosphere and/or temperature. The atmospheres and temperatures in the furnace can simply by changed in a sequential fashion during one continuous furnace run. Thus, it is not necessary to carry out distinct and separate furnace heat treatments for fiber fabrication and fiber surface modification.

Alternatively, the heat treatments can be carried out on pre-existing SiC fibers. Hence, the method could be applied to improve the properties of pre-existing fibers such as HI-NICALON TYPE S™ produced by Nippon Carbon Co. and SYLRAMIC™ produced by Dow Corning Corp. and any other appropriate commercially produced or developmental SiC fiber.

The process is demonstrated in the examples below for SiC fibers prepared by dry spinning of polycarbosilane-based polymers, but it is evident that the process can be applied to other SiC fiber fabrication processes, including polymer-derived fiber fabrication processes based on melt spinning, wet spinning, or dry spinning of other organosilicon pre-ceramic polymers. The process can be applied to SiC fibers prepared by fabrication methods based on powder processing and vapor-phase processing. Furthermore, the process can be applied to other SiC ceramics such as bulk samples, substrates, coatings, etc.

Two types of measurements were carried out to demonstrate the simultaneous development of high strength and high creep resistance in the SiC fibers produced in this invention: (i) tensile strength tests and (ii) Morscher-DiCarlo bend stress relaxation (BSR) tests. The tensile strength measurements were carried out according to the ASTM (American Society for Testing and Measurements) procedure D3379. The BSR tests were carried out using the method developed by Morscher and DiCarlo (J. Am. Ceram. Soc., 75[1] 136–140 1992). This test involves subjecting the fiber to heat treatment under a fixed stress and then determining a stress relaxation ratio, designated as the "M" value. This value is considered to be a measure of creep resistance of the fiber. It depends on the various testing conditions (the time/temperature schedule using during heat treatment, the stress on the fibers during heat treatment, etc.) and the fiber characteristics. M takes on values between 0 and 1. For a given stress and time/temperature heat treatment schedule, fibers with better creep resistance will have M values closer to 1. As will be described below, the SiC fibers in this invention show higher M values compared to other SiC fibers tested under the same conditions (1400 degrees C. in argon for one hour).

EXAMPLES

Example 1

(A Comparative Example)

The first example describes the preparation of a control fiber sample, i.e., a boron-doped SiC fiber which was prepared using only the procedures described in U.S. patent application Ser. No. 08/683,475. Polycarbosilane (PCS) polymers with molecular weights of approximately 10,000 and 11,000 were synthesized by pressure pyrolysis of polydimethylsilane (PDMS) according to the procedure of Toreki et al. in U.S. Pat. No. 5,171,722. Polyvinylsilazane (PSZ) was prepared according to the procedures of Toreki et al. in U.S. Pat. No. 5,171,722 and in "Synthesis and Applications of a Vinylsilazane Preceramic Polymer," Ceram. Eng. Sci. Proc., 11 [9–10] 1371–1386 (1990). Polyvinylsiloxane (PSO) were prepared according to the same procedures as used for PSZ preparation, except that a siloxane monomer was used instead of a silazane monomer in the polymerization reaction. Solid boron hydride (SBH), dicumyl peroxide (DCP), and toluene were obtained commercially and used without any modification. Two separate spinning solutions were prepared with the same composition using the aforementioned PCS polymers with molecular weights of approximately 10,000 and 11,000. Each solution was prepared by mixing 9.0 mL toluene, 3.8 g PCS, 0.294 g of PSO, 0.042 g PSZ, 0.063 g SBH, and 4 mg DCP. The solutions were filtered and then concentrated by rotary evaporation to increase the viscosity until the solutions had solvent (toluene) concentration in the range of approximately 30–35%. The concentrated polymer solutions were used to form "green" fibers by the conventional dry spinning method. The "green" (as-collected) fibers were heat treated according to the procedures in U.S. Pat. No. 5,792,416 in order to pyrolytically decompose the organometallic precursor polymers (thereby forming a substantially SiC ceramic) and to subsequently densify the SiC fiber via sintering. Sintering heat treatments were carried out using a maximum temperature of ~1840–1845° C. for 12 minutes in a flowing argon atmosphere.

The fibers produced by the above method had an average tensile strength of ~2.8 GPa. The average fiber diameter was ~10 μm. The fibers contained ~1 wt % boron, as determined by neutron activation analysis. BSR tests were carried out using heat treatment at 1400° C. for 1 hour in an argon atmosphere. The average M value under these conditions was ~0.5.

As noted earlier, it is generally undesirable to sinter fibers at higher temperatures higher and/or longer times than required to achieve densification. This was demonstrated with the control SiC fibers by carrying out heat treatment as follows. The fibers were initially heat treated in the same fashion as the sample described above. However, after heating at 1840° C. for 12 minutes in an argon atmosphere, the heat treatment was continued at this temperature for an additional 5 minutes and then the temperature was raised to 1940° C. while maintaining the argon atmosphere. The fibers were held at 1940° C. for 1 hr in the argon atmosphere and then the furnace was cooled to room temperature. The fibers had an average diameter of ~10 μm. The average tensile strength was ~2.1 GPa, i.e., a 25% decrease in tensile strength from the value obtained for the control fiber samples which were only heat treated at 1840–1845° C. for 12 minutes. The decrease in strength is attributed to grain growth. Transmission electron microscopy (TEM) observations showed that grains grow to a larger size when fibers were heat treated to temperatures above the sintering temperature.

Example 2

(A Comparative Example)

BN-coated samples were prepared using the same batches of "green" fibers that had been prepared for EXAMPLE 1. The green fibers were initially heat treated in the same way as the fibers prepared in EXAMPLE 1. Sintering was carried out at ~1840–1845° C. for 12 minutes in an argon atmosphere. However, after the 12 minute hold period, the flow of argon gas into the furnace was discontinued and the furnace was filled with nitrogen gas. (A flowing atmosphere is maintained during all the heat treatment operations such that the gas entering into the furnace forces out the gas which is already within the furnace. Hence, the argon atmosphere was quickly replaced by a nitrogen gas atmosphere.) The temperature was held at ~1840–1845° C. for an additional 5 minutes after the flow of argon gas into the furnace was discontinued and the flow of nitrogen into the furnace was started. The temperature was then increased to 1890° C. while maintaining the nitrogen atmosphere. The samples were held at 1890° C. for 10 minutes in the nitrogen atmosphere and then the furnace was cooled to room temperature.

The SiC fibers produced with BN coatings by the above method had essentially the same average tensile strength (within experimental error) as the control (uncoated) SiC fibers in EXAMPLE 1 which were sintered at 1840–1845° C. in argon for 12 minutes. The fibers heat treated in nitrogen at 1890° C. for 10 minutes (in this example) had an average tensile strength of ~2.9 GPa and an average diameter of ~10 $\mu$m.

Figure 2:
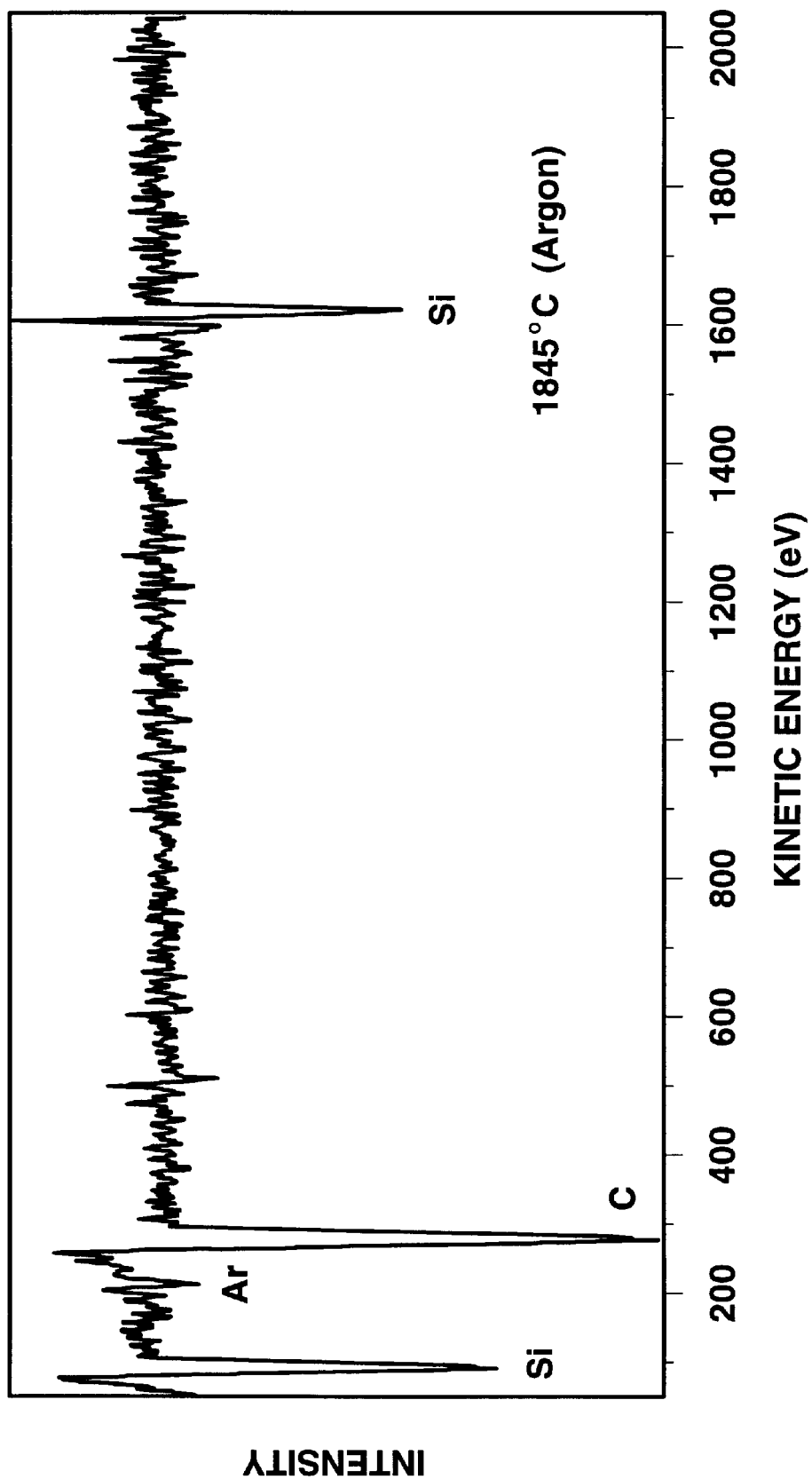
FIG. 2 is an AES spectrum for the same control (uncoated) SiC fiber after it has been subjected to sputtering with argon in order to remove the thin layer of carbon from the SiC fiber surface.

The development of a BN coating on the SiC fibers heat treated in a nitrogen atmosphere was proven using the surface characterization technique of Auger Electron Spectroscopy (AES). For comparison, FIG. 1 shows an AES spectrum for the control (uncoated) SiC fiber sample from EXAMPLE 1 which was heat treated at 1845° C. for 12 minutes in argon. Carbon (C) is the major element observed in the spectrum. Some silicon (Si) and oxygen (O) peaks are also observed. The control fiber sample has a thin, highly carbon-rich layer. It is known from published scientific studies that when silicon carbide is heat treated at high temperatures in inert or reducing atmospheres, some silicon tends to preferentially evaporate from the near surface region. (In addition, there is a tendency for some extra carbon (so-called "adventitious" carbon) to contaminate the surface of samples during AES studies. The oxygen peak in the spectra in FIG. 1 is also believed to be due surface contamination, probably coming from the mounting material (an adhesive) used to hold the fibers in place when the AES chamber was evacuated. This is believed because it is known from bulk chemical analyses that the overall oxygen content of the fibers is less than ~0.1 wt %.) FIG. 2 shows the AES spectrum for the same control (uncoated) SiC fiber after it had been subjected to sputtering with argon in order to remove the thin layer of carbon from the SiC fiber surface. The spectrum now appears more representative of the bulk SiC fiber, i.e., the Si:C ratio is close to that of stoichiometric SiC.

Figure 3:
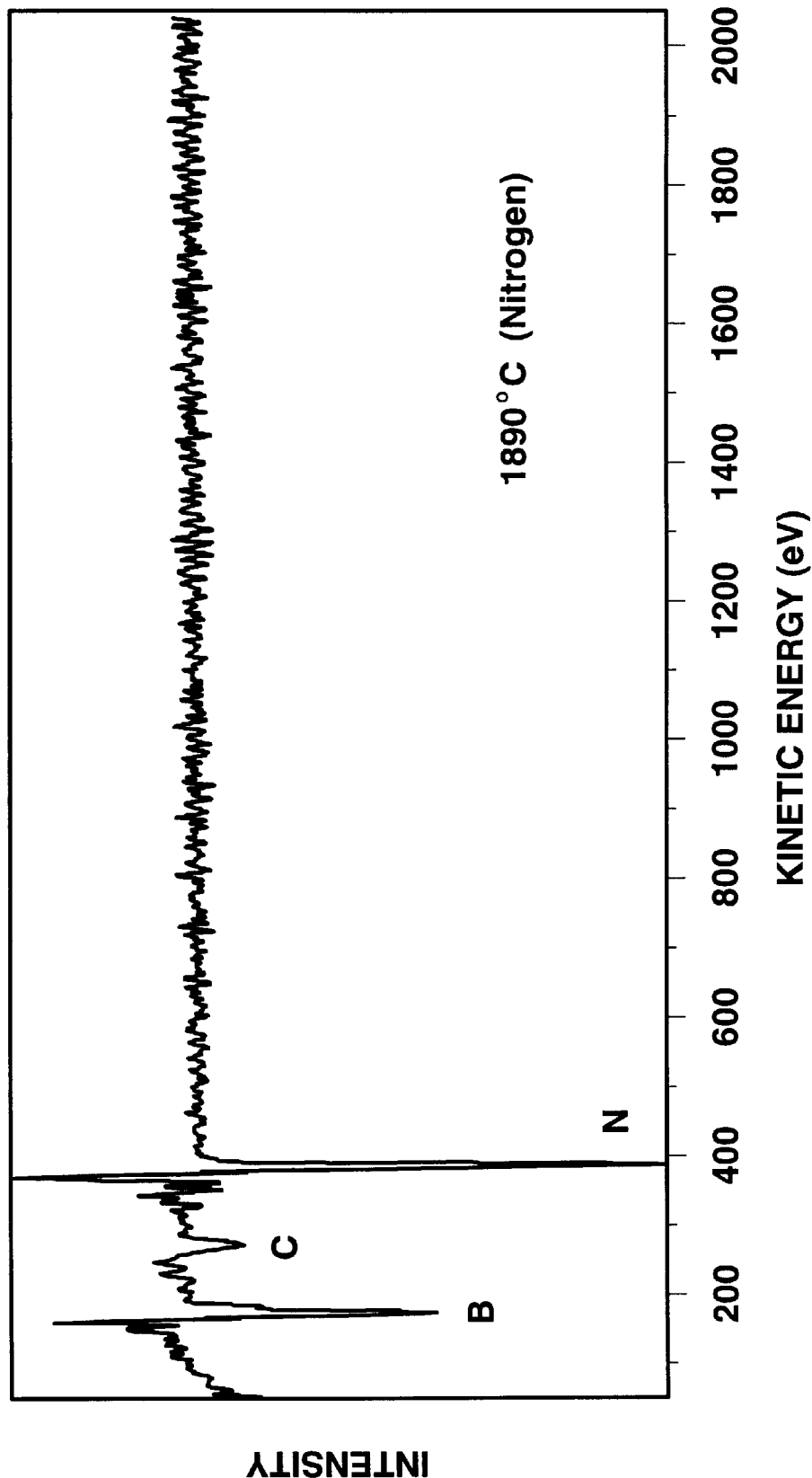
FIG. 3 shows the AES spectrum for a BN-coated SiC fiber of Example 2 prepared by heat treatment at 1890° C. for 10 minutes in a nitrogen atmosphere.
Figure 4:
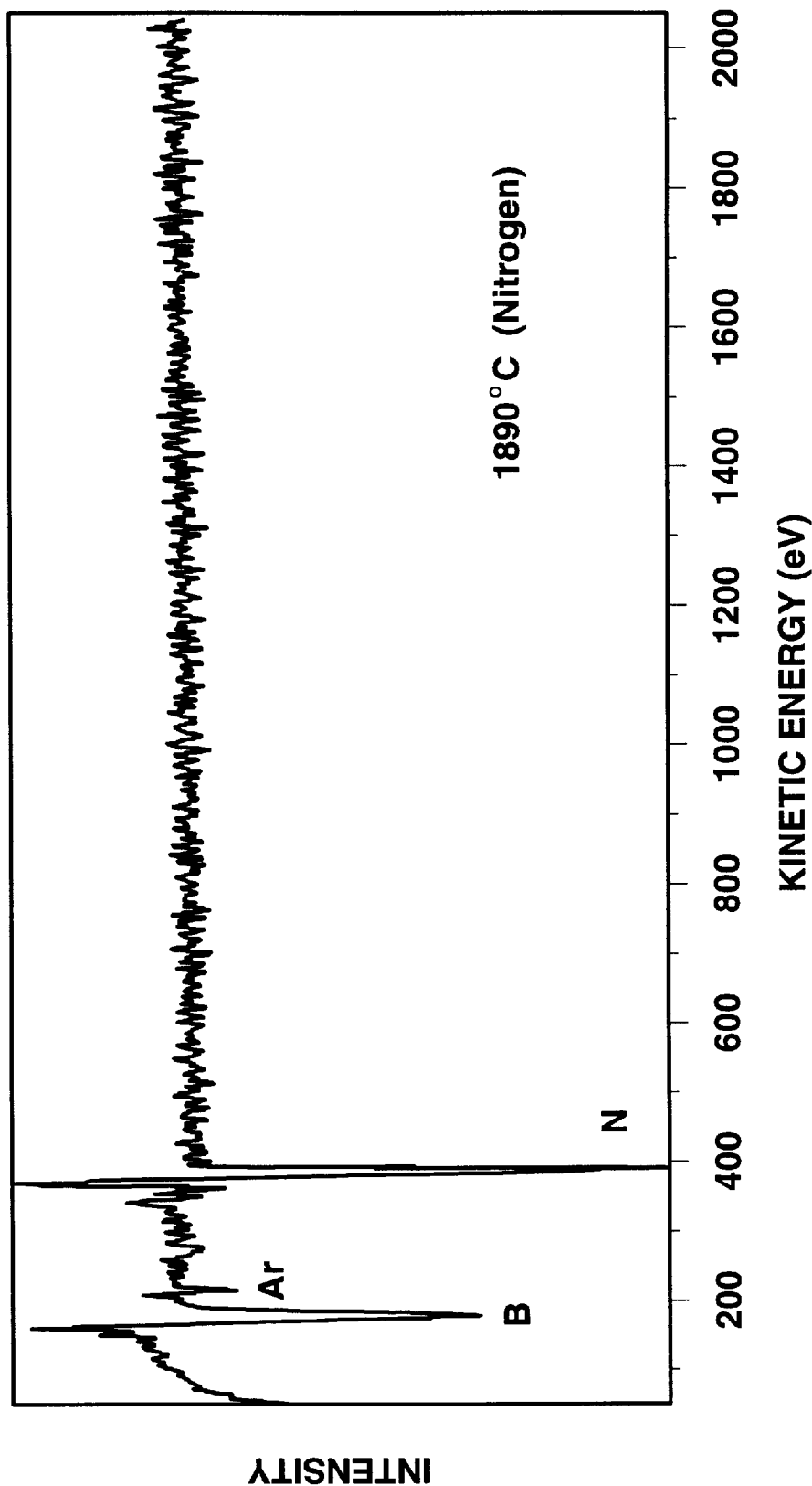
FIG. 4 shows the AES spectrum for the BN-coated fiber of FIG. 3 after it has been subjected to sputtering with argon in order to remove a thin layer of the SiC fiber surface.

FIG. 3 shows the AES spectrum for the BN-coated SiC fiber prepared by heat treatment at 1890° C. for 10 minutes in a nitrogen atmosphere. The major peaks observed are for B and N. A small peak is observed for C, but this might be due to adventitious carbon contamination. FIG. 4 shows the AES spectrum for the same BN-coated fiber (prepared by heat treatment at 1890° C. for 10 minutes in a nitrogen atmosphere) after it had been subjected to sputtering with argon in order to remove a thin layer of the SiC fiber surface. The only significant peaks in the spectrum are for B and N. (A small peak for argon is observed which comes from using argon for sputtering.)

Additional BN-coated SiC fiber samples were prepared using the same procedure as described above except that the heat treatment temperature was changed. Sintering was still carried out at ~1840–1845° C. for 12 minutes in an argon atmosphere. After the 12 minute hold period, the flow of argon gas into the furnace was discontinued and the furnace was filled with nitrogen gas. The temperature was held at ~1840–1845° C. for an additional 5 minutes after the flow of argon gas into the furnace was discontinued and the flow of nitrogen into the furnace was started. The temperature was then increased to 1940° C. while maintaining the nitrogen atmosphere. The samples were held at 1940° C. for 1 hr in the nitrogen atmosphere and then the furnace was cooled to room temperature.

Figure 5:
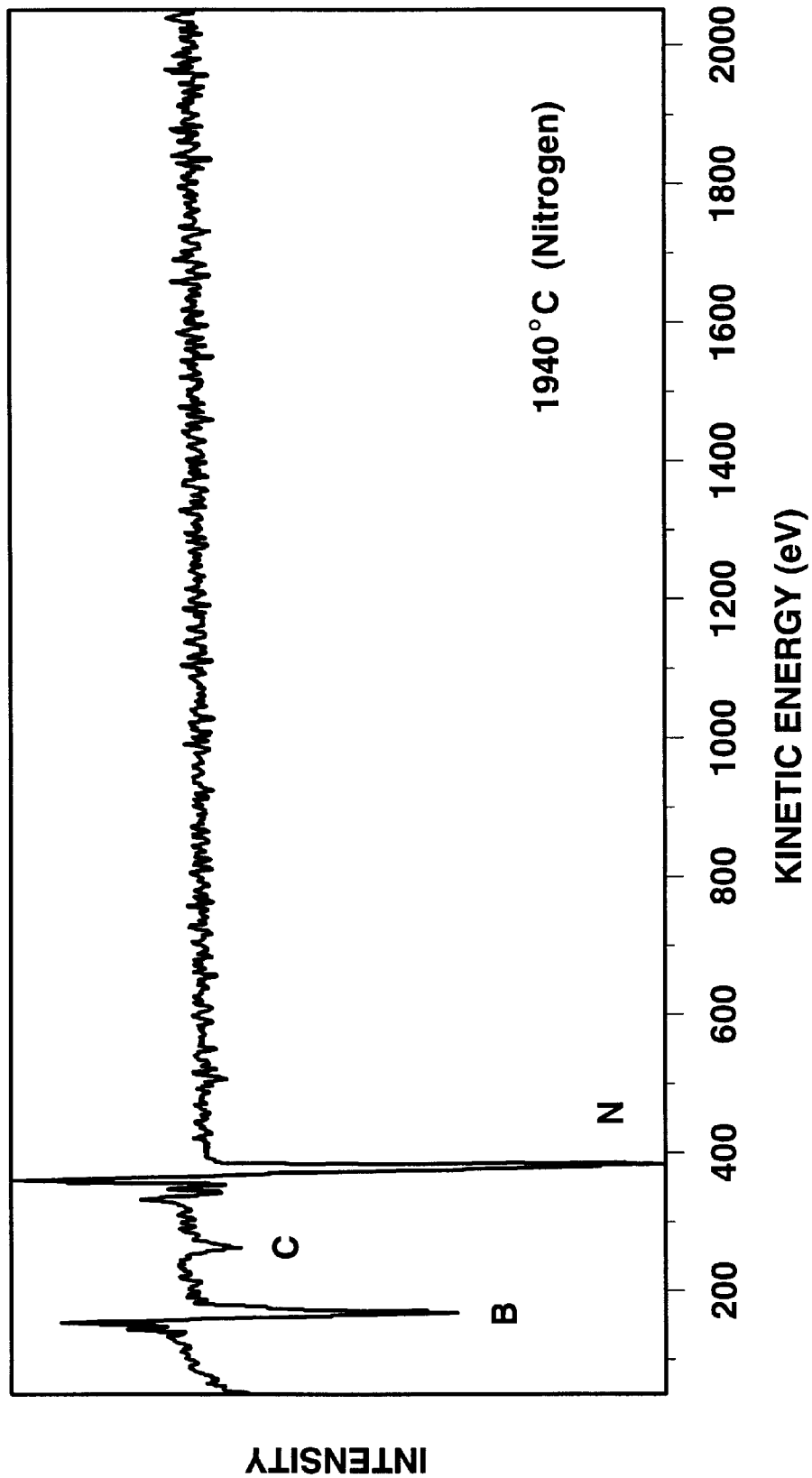
FIG. 5 shows the AES spectrum for the unsputtered surface for a BN-coated SiC fiber of Example 2 prepared by heat treatment at 1940° C. for 1 hour in a nitrogen atmosphere.

FIG. 5 shows the AES spectrum for the unsputtered surface for the BN-coated SiC fiber prepared by heat treatment at 1940° C. for 1 hour in a nitrogen atmosphere. The spectrum is essentially identical to the spectrum in FIG. 3 for the unsputtered surface for the BN-coated SiC fiber prepared by heat treatment at 1890° C. for 10 minutes in a nitrogen atmosphere. The major peaks observed are for B and N.

The fibers heat treated in nitrogen at 1940° C. for 1 hour had an average tensile strength of ~2.9 GPa and an average diameter of ~10 $\mu$m, i.e., essentially the same values as obtained for the control sample fibers in EXAMPLE 1 which were sintered at 1840–1845° C. in argon for 12 minutes. However, the SiC fibers produced with BN coatings by the above method have greatly improved creep resistance, as indicated by BSR tests, compared to the control (uncoated) SiC fibers in EXAMPLE 1 which were sintered at 1840–1845° C. in argon for 12 minutes. The average M value obtained from a BSR test at 1400° C. for 1 hour in argon was ~0.9 for the sample heat treated at 1940° C. for 1 hour in a nitrogen atmosphere. This M value is similar or higher than reported for relatively low-strength, powder-derived fibers (such as Carborundum SiC fibers produced by the method of Frechette et al.).

Example 3

(A Comparative Example)

EXAMPLE 2 showed that BN-coated SiC fibers with high tensile strength are developed when the fibers are heat treated in nitrogen at a temperature above the sintering temperature. In contrast, this example shows that using a nitrogen atmosphere for the sintering (densification) stage, which has been practiced sometimes in the prior art, will not produce fibers with high tensile strength.

Fibers were prepared using the same batches of "green" fibers that had been prepared for EXAMPLE 1. The green fibers were heat treated in the same way as the fibers prepared in EXAMPLE 1 up through the initial pyrolysis, i.e., up to a heat treatment temperature of 1150° C. (which is sufficient to pyrolytically decompose the organosilicon polymer to an SiC-based ceramic). Above 1150° C., the fiber in this example was heat treated in a nitrogen atmosphere, instead of the argon atmosphere used in EXAMPLE 1. The fibers were first heat treated at ~1840–1845° C. for 12 minutes in the nitrogen atmosphere. After the 12 minute hold period, the temperature was increased to 1870° C. while maintaining the nitrogen atmosphere. The samples were held at 1870° C. for 10 minutes in the nitrogen atmosphere and then the furnace was cooled to room temperature. The fibers heat treated in this manner had an average tensile strength of only 1.4 GPa. The average diameter of the fibers was ~11 µm.

Example 4

Fibers were prepared using the same batches of "green" fibers that had been prepared for EXAMPLE 1. The green fibers were initially heat treated in the same way as the fibers prepared in EXAMPLE 1. Sintering was carried out at ~1840–1845° C. for 12 minutes in an argon atmosphere. However, after the 12 minute hold period, the flow of argon gas into the furnace was discontinued and the furnace was filled with nitrogen gas. The temperature was held at ~1840–1845° C. for an additional 5 minutes after the flow of argon gas into the furnace was discontinued and the flow of nitrogen into the furnace was started. The temperature was then increased to 1890° C. while maintaining the nitrogen atmosphere. The samples were held at 1890° C. for 10 minutes in the nitrogen atmosphere. The temperature was then decreased to 1700° C. while maintaining the nitrogen atmosphere during cooling. Upon reaching 1700° C., the flow of nitrogen gas was discontinued and the furnace was filled with a gas having an approximate composition of 15% carbon monoxide (CO)/85% argon. The samples were held at 1700° C. for 30 minutes in the 15% carbon monoxide (CO)/85% argon atmosphere. The atmosphere was then switched to argon only and the furnace was cooled under the argon atmosphere.

The SiC fibers produced under the above conditions had an average tensile of 3.0 GPa and an average diameter of ~10 µm. The average M value obtained from a BSR test at 1400° C. (for 1 hour in argon) was ~0.81 which is similar to powder-derived SiC fibers (such as Carborundum SiC fibers produced by the method of Frechette et al.). Hence, SiC fibers with high tensile strength and significantly improved creep resistance (as indicated by the M value from the 1400° C. BSR test) have been developed relative to the fibers in EXAMPLE 1 (which were produced using only the steps indicated in U.S. patent application Ser. No. 08/683,475). In addition, the SiC fibers produced by this method show improved creep resistance compared to other high-strength SiC fibers. For example, DiCarlo (Composites Science and Technology, 51 213–222, 1994) and Takeda et al. (Ceram. Eng. Sci. Proc., 17[4] 35–42, 1996) have reported M values in the range of approximately 0.5–0.6 for SYLRAMIC™ fibers and HI-NICALON TYPE S™ fibers in BSR tests carried out at 1400° C. for 1 hour in argon. As noted previously. Takeda et al. showed that the M values for the HI-NICALON TYPE S™ fibers can be increased (i.e., to similar values as obtained for the SiC fibers in this example) by annealing at temperatures above the sintering temperature. However, the strength of such annealed fibers prepared by Takeda et al. decreased very significantly upon annealing (i.e., to values ≦1.5 GPa).

Figure 6:
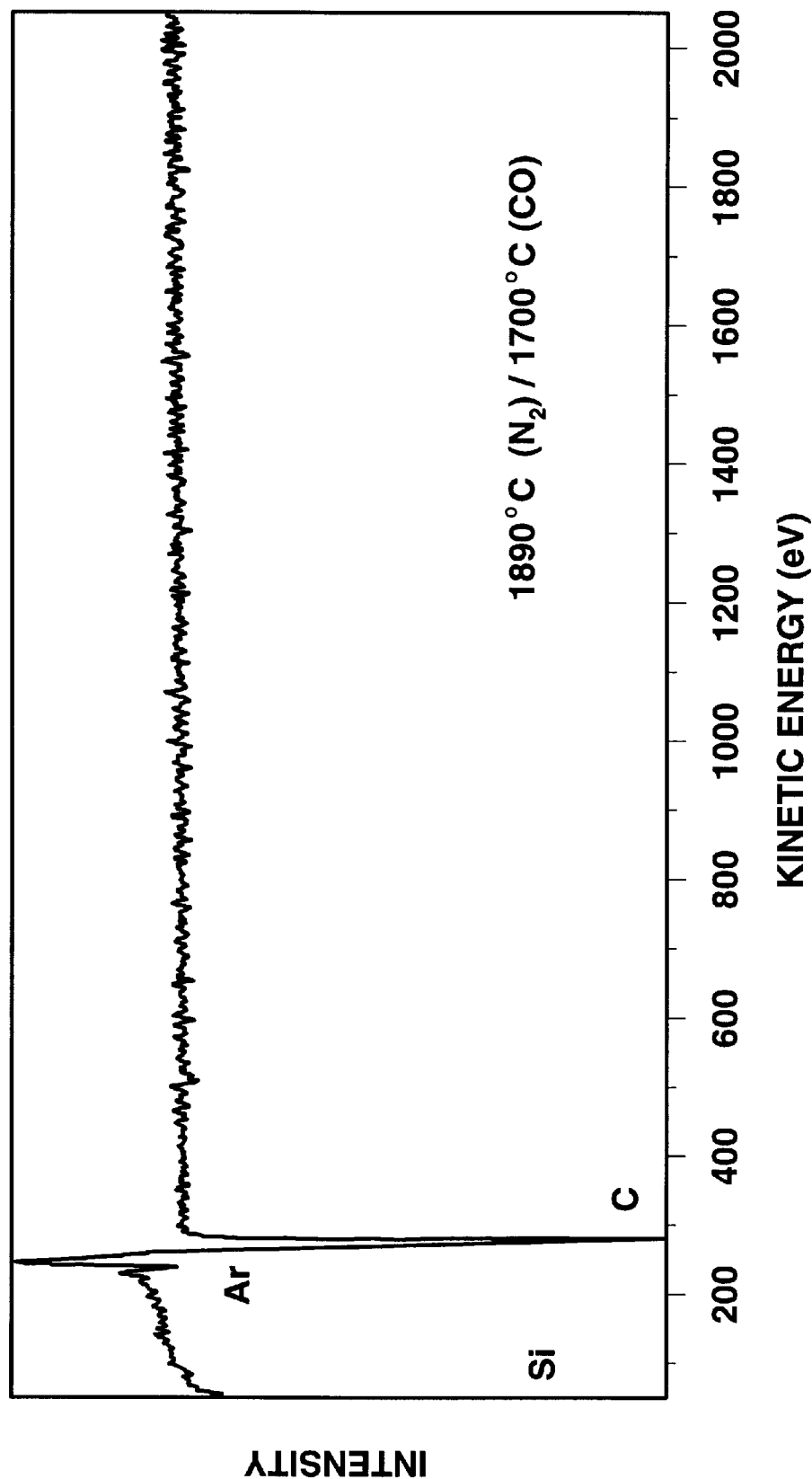
FIG. 6 shows the AES spectrum for the unsputtered surface for the SiC fiber of Example 4.

FIG. 6 shows the AES spectrum for the unsputtered surface for the SiC fiber prepared according to the above conditions. The only significant element detected at the surface of the fiber was carbon (C). This should be compared to the spectrum in FIG. 3 (EXAMPLE 2) which is for the unsputtered surface for the SiC fiber prepared by the same heat treatment conditions as used for the fibers in this example except that the heat treatment step in the CO gas-containing atmosphere was not carried out for EXAMPLE 2. The spectrum in FIG. 3 shows that the SiC fiber in EXAMPLE 2 developed a BN coating on the surface. It is evident from FIG. 6 that there is no BN coating on the SiC fiber heat treated in the CO-containing gas atmosphere. In U.S. Provisional Appl. Ser. No. 60/055,424, it was shown that heat treatment in a CO-containing atmosphere can remove boron from SiC fibers. In the present invention, it is now shown that heat treatment in the CO-containing gas atmosphere can be used to remove boron nitride (BN) coatings.

The fibers produced in this example were also subjected to argon sputtering in order remove a thin surface layer. AES on the new surface layer showed that some B and N remain in the fibers.

Example 5

Fibers were prepared using the same batches of "green" fibers that had been prepared for EXAMPLE 1. The green fibers were initially heat treated in the same way as the fibers prepared in EXAMPLE 1, except that sintering was carried out at ~1840–1845° C. for 15 minutes (instead of 12 minutes) in an argon atmosphere. After this 15 minute hold period, the flow argon gas was discontinued and the furnace was filled with a gas having an approximate composition of 15% carbon monoxide (CO)/85% argon. After a 50 minute hold period at the same temperature, the flow of the 15% carbon monoxide (CO)/85% argon gas was discontinued and the furnace was filled with nitrogen gas. After another 10 minute hold period at the same temperature, the temperature was increased to 1940° C. while maintaining the nitrogen atmosphere. The samples were held at 1940° C. for 30 minutes in the nitrogen atmosphere. The furnace was then cooled to room temperature while maintaining the nitrogen atmosphere.

The SiC fibers produced under the above conditions had an average tensile of ~2.8 GPa and an average diameter of ~10 µm. The average M value obtained from a BSR test at 1400° C. (for 1 hour in argon) was ~0.9. Hence, SiC fibers with high tensile strength and significantly improved creep resistance (as indicated by the M value from the 1400° C. BSR test) have been developed relative to the fibers in EXAMPLE 1 (which were produced using only the steps indicated in U.S. patent application Ser. No. 08/683,475). In addition, the fibers produced by this method show improved creep resistance compared to other high-strength SiC fibers, such as SYLRAMIC™ fibers and HI-NICALON TYPE S™ fibers.

Figure 7:
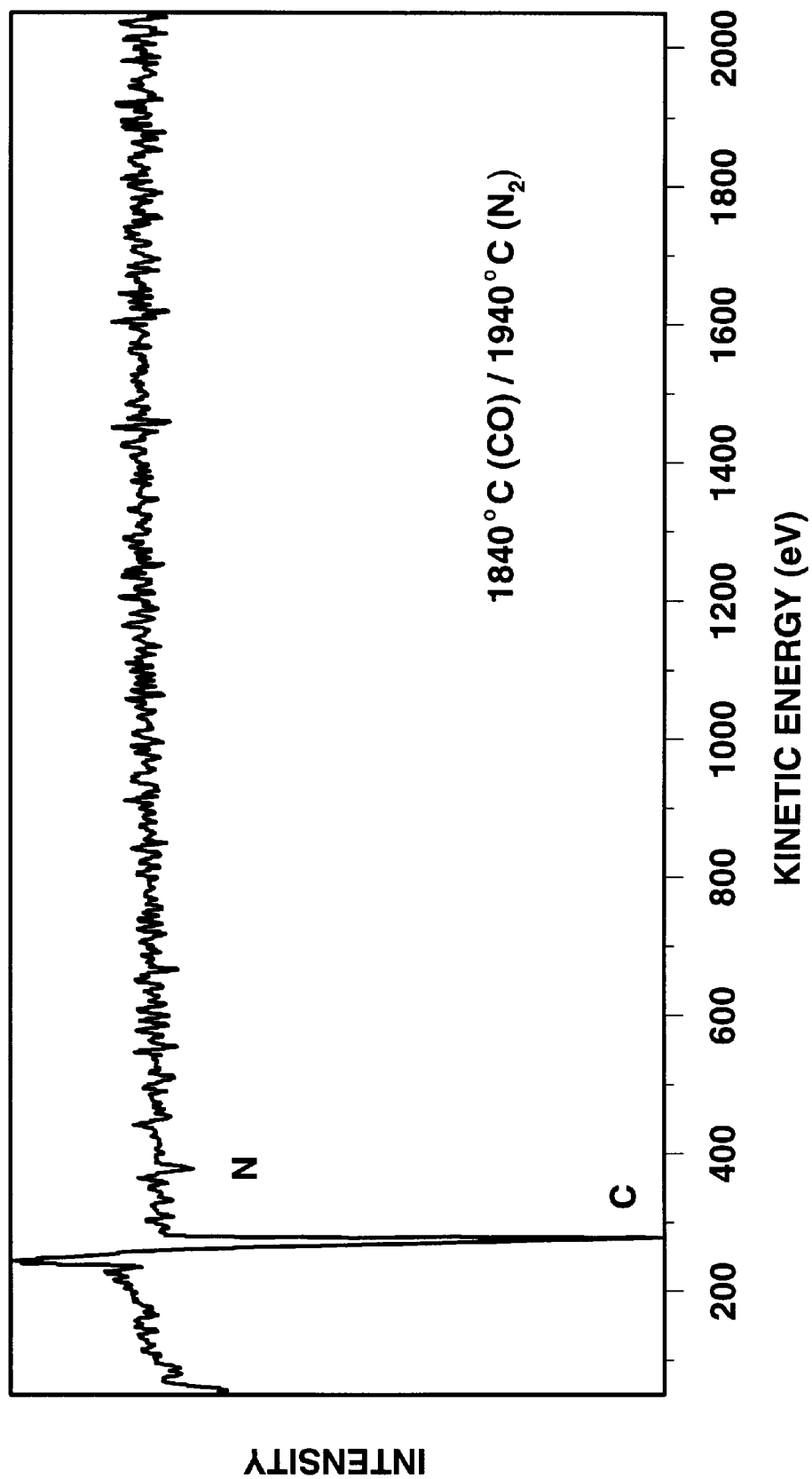
FIG. 7 shows the AES spectrum for the unsputtered surface for the SiC fiber of Example 5.

FIG. 7 shows an AES spectrum for the unsputtered surface for the SiC fiber prepared according to the above conditions. The primary element detected at the surface of the fiber was carbon (C). A small amount of nitrogen (N) is also present. It is evident that the fibers do not have a BN coating.

The illustrations set forth above are by way of example only, and the true scope and definition of the invention is to be as set forth in the following claims.

I claim:

1. A method of forming a high strength, high creep resistance, silicon carbide fiber having no boron nitride coating, comprising the steps of:
   (A) providing a boron-doped, silicon carbide fiber which has been sintered at a sintering temperature to densify the fiber;

(B) exposing the fiber to a nitrogen-containing atmosphere at a temperature at least equal to the sintering temperature;

(C) exposing the fiber to an atmosphere containing carbon monoxide at a temperature sufficient to remove boron and boron nitride from the fiber.

2. The method of claim 1, where said fiber is first exposed to the nitrogen-containing atmosphere and secondly exposed to the carbon monoxide-containing atmosphere.

3. The method of claim 1, where said fiber is first exposed to the carbon monoxide-containing atmosphere and secondly exposed to the nitrogen-containing atmosphere.

4. The method of claim 2, where the temperature of the fiber in the nitrogen-containing atmosphere is at least approximately 45 degrees C. above the sintering temperature.

5. The method of claim 4, where the temperature of the fiber in the carbon monoxide-containing atmosphere is lowered to at least the sintering temperature.

6. The method of claim 3, where the temperature of the fiber in the carbon monoxide-containing atmosphere is approximately equal to the sintering temperature.

7. The method of claim 6, where the temperature of the fiber in the nitrogen-containing atmosphere is at least approximately 100 degrees C. above the sintering temperature.

8. The method of claim 1, where said fiber has a density of at least approximately 3.0 g/cm$^3$.

9. The method of claim 1, where said nitrogen-containing atmosphere is 100 percent nitrogen.

10. The method of claim 1, where said carbon monoxide-containing atmosphere has at least about 15 percent carbon monoxide.

11. The method of claim 1, where the fiber is exposed to said atmosphere containing nitrogen at a temperature between approximately 1750 and 2250 degrees C. and to said atmosphere containing carbon monoxide at a temperature between approximately 1600 and 2200 degrees C.

12. The method of claim 1, where the fiber is exposed to said atmosphere containing carbon monoxide at a temperature between approximately 1700 and 1900 degrees C.

13. A method of forming a high strength, high creep resistance, silicon carbide fiber having no boron nitride coating, comprising the steps of:

(A) providing a boron-doped, silicon carbide fiber;

(B) exposing the fiber to an atmosphere containing nitrogen at a temperature between approximately 1750 and 2250 degrees C.; and (C) exposing the fiber to an atmosphere containing carbon monoxide at a temperature between approximately 1600 and 2200 degrees C.

14. The method of claim 13, where said nitrogen-containing atmosphere is 100 percent nitrogen.

15. The method of claim 13, where said carbon monoxide-containing atmosphere has at least about 15 percent carbon monoxide.

* * * * *